Figure 1:
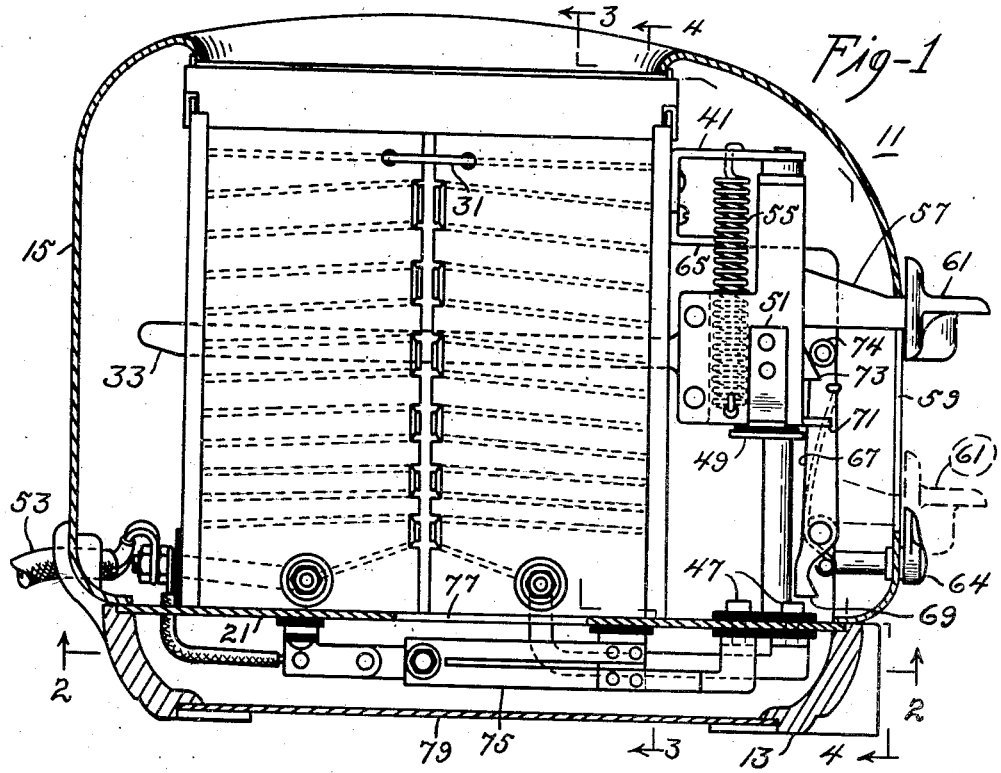

Dec. 17, 1946.　　　J. R. GOMERSALL ET AL　　　2,412,727
AUTOMATIC ELECTRIC TOASTER COMPENSATOR FOR
VARIABLE VOLTAGE CURRENT SUPPLY
Filed Feb. 16, 1942　　　2 Sheets-Sheet 1

INVENTORS.
MURRAY IRELAND
JOHN R. GOMERSALL
BY H. M. Biebel
ATTORNEY

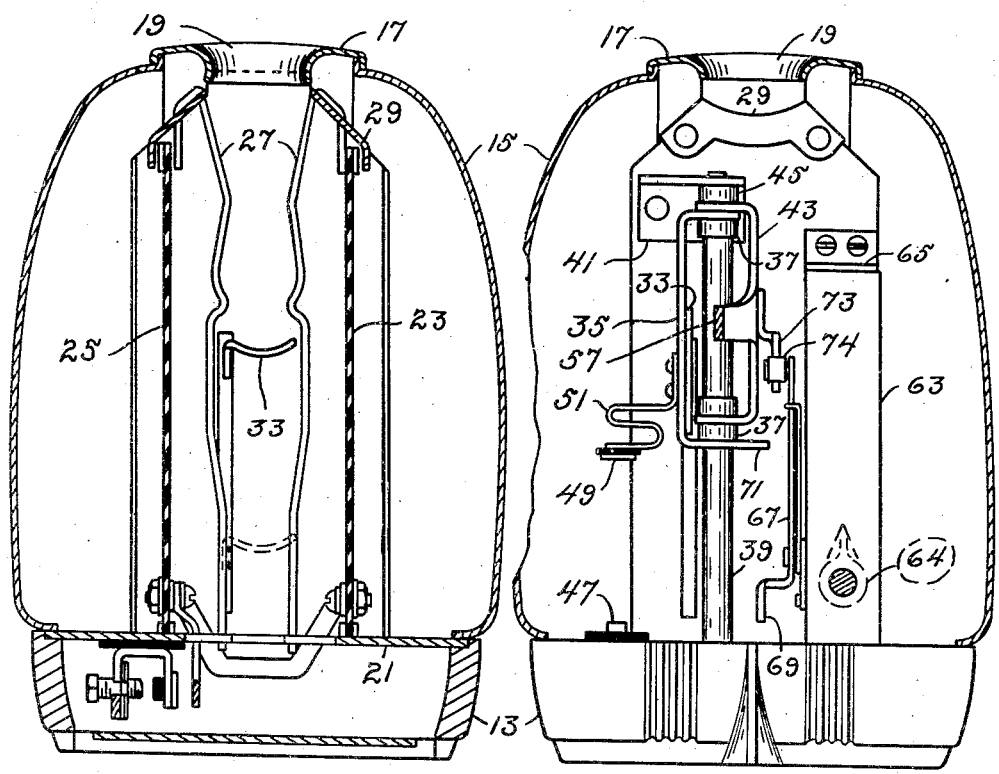
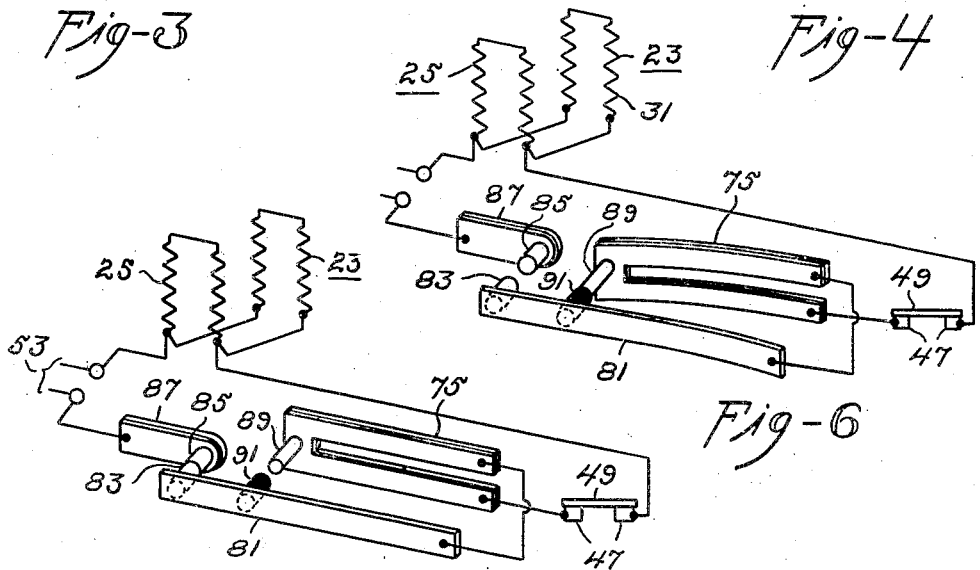

Patented Dec. 17, 1946

2,412,727

UNITED STATES PATENT OFFICE 2,412,727

AUTOMATIC ELECTRIC TOASTER COMPENSATOR FOR VARIABLE VOLTAGE CURRENT SUPPLY

John R. Gomersall, Elgin, and Murray Ireland, near Elgin, Ill., assignors to McGraw Electric Company, Elgin, Ill., a corporation of Delaware Application February 16, 1942, Serial No. 431,088

5 Claims. (Cl. 219—19)

Our invention relates to electric cooking devices and particularly to automatic electric toasters.

An object of our invention is to provide means applicable to an automatic electric toaster which will compensate for the effect of a variable voltage current supply energizing the toast heating elements.

Another object of our invention is to provide an automatic electric toaster that may be connected to energizing circuits of appreciably different voltages and which will provide substantially the same degree of toasting for different slices of bread.

Another object of our invention is to provide a new method for toasting slices of bread comprising the steps of limiting the maximum temperature of the heat applied to the slice or slices of bread and subjecting the bread to the action of the heat for a preset and fixed length of time.

Another object of our invention is to provide relatively simple means which will ensure that, for a given setting of the control elements of an automatic electric toaster, substantially the same amount of heat from the toast heating elements will reach or affect the slice or slices of bread being toasted, irrespective of the voltage of the supply circuit to which the toast heating elements are connected.

Other objects of our invention will either be apparent from a description of one form embodying our invention or will be pointed out in the course of such description and set forth in the appended claims.

Figure 2:
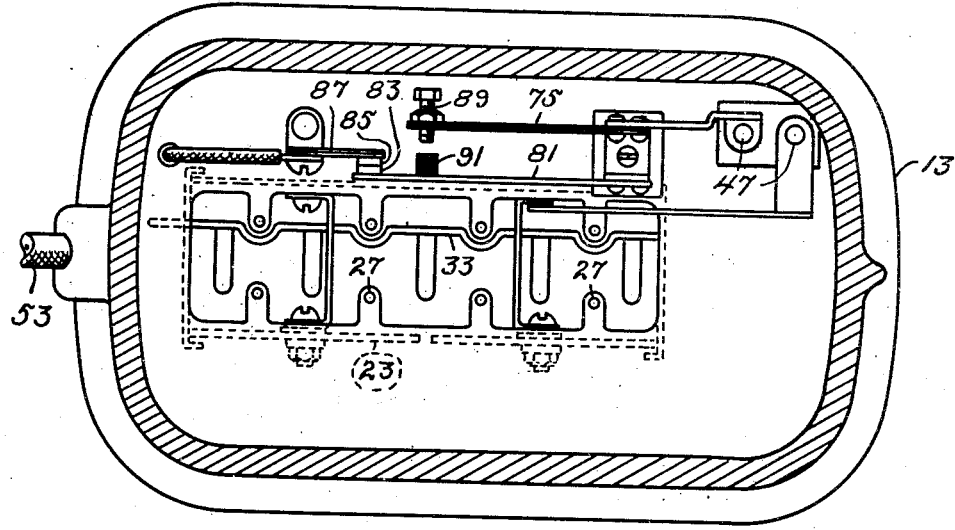

In the drawings:

Figure 1 is a longitudinal vertical sectional view through a toaster embodying our invention, Fig. 2 is a horizontal sectional view on the line 2—2 of Fig. 1, Fig. 3 is a vertical sectional view taken on the line 3—3 of Fig. 1, Fig. 4 is a vertical sectional view taken on the line 4—4 of Fig. 1, Fig. 5 is a diagram of the electrical connections showing the position of the contacts while still at lower temperature, and, Fig. 6 is a diagram of the electrical circuits showing the parts of Fig. 5 after having been heated to a given temperature.

We have elected to show our invention and particularly the novel elements thereof as applied to a single-slice automatic electric toaster but it is to be understood that our invention may be applied to other types of toasters.

We have illustrated an automatic electric toaster assembly 11 which comprises a moulded skeleton frame 13 and an outside casing 15 which in general are of the type which have been made and sold heretofore. The outside casing 15 has an open upper end portion in which there is located a top closure member 17 which, as shown more particularly in Fig. 3 of the drawings, is provided with a bread-slice inserting and toast removing opening 19, in a manner now well known in the art. The toaster assembly is provided further with a relatively thin sheet metal bottom plate 21 suitably secured against the upper surface of the frame 13 and the bottom edge portions of the casing 15 may be secured either against the bottom plate 21 or the moulded base 13 as may be found desirable or suitable.

Our toaster assembly includes further a pair of spaced vertically extending planar toast heating elements 23 and 25 which may be held in their proper operative positions within the casing by any suitable or desired means not pertinent to nor constituting a part of our invention. In order to properly center a slice of bread while it is toasting in a vertical position between the toast heating elements 23 and 25 we provide guard or guide wires 27 the lower ends of which may extend through the base plate 21 and the upper return-bent end portions may be supported by longitudinally extending top frame plates 29 or in any other suitable or desired manner. A strand of resistance conductor 31 may be wound on relatively thin sheets of electric insulating material, such as mica, which constitute a part of the toast heating elements 23 and 25.

We provide further bread carriers 33 extending substantially horizontally between the spaced toast heating elements and the front end of such bread carrier may be rigidly connected with a first carriage 35, of substantially L-shape, which carriage is provided at its upper and at its lower ends with guide bushings 37 adapted to move vertically reciprocally on a vertical standard 39. The lower end of this standard may be supported by the base plate 21 while the upper end thereof may be supported by a small bracket 41, all in a manner well known in the art.

We provide further a second reciprocally movable carriage 43, which second carriage is provided with upper and lower bearing bushings 45 which are adapted to move on the vertical standard 39.

We provide a main switch for the toast heating elements, which switch comprises a pair of contact members 47 insulatedly supported in proper operative position on the base plate 21 near its front edge portion. Carriage 35 is adapted to support a contact bridging member 49 insulatedly secured to a resilient member 51 which member 51 is carried by and moves with the first mentioned carriage 35. When the carriage 35 is moved to its lowermost position, contact bridging member 49 will engage the contact members 47 to thereby close an energizing circuit through the toast heating elements, it being assumed, of course, that the toast heating elements are electrically connected by means of a twin conductor cord 53 with a suitable source of supply of electric energy.

The bread carrier is normally yieldingly biased to an upper non-toasting position by means of a tension coil spring 55 one end of which is connected to carrier 33 or carriage 35 while the other end thereof may be connected to bracket 41.

The second carriage plate 43 is provided with a forwardly-extending portion 57 which is of such length as to extend outwardly beyond the front portion of the casing 15 is through a slot 59 therein and an actuating knob 61 is secured to the arm 57 so that an operator may press downwardly on knob 61 to cause downward movement of carriage 43, carriage 35, and the bread carrier when it is desired to move the bread carrier into its lowermost toasting position.

We provide also a suitable timing mechanism 63 here shown as including a spring-driven train of gears of the general kind shown in Ireland Patent No. 1,866,808 but it is to be understood that any other timer which will operate for an adjustably preset fixed length of time may be used in place of such mechanical timer. An adjusting knob 64 may be provided, by which the operating period of the timer may be manually varied. The timer mechanism 63 is held in proper operative position by a bracket 65.

The timer is provided with a lever detent member 67 pivotally mounted on the timing mechanism 63 near the lower end of the lever and an end portion 69 is provided on the lever 67 at its lower end which portion 69 is adapted to be engaged by a laterally projecting portion 71 constituting a part of or secured to the first carriage 35. Thus when carriage 35 is moved downwardly, as hereinbefore described, it will engage the portion 69 and be held in its lowered position, that is, with the carrier in its toasting position for such length of time as may be determined by the operation of the timing mechanism 63.

The timing mechanism 63, when it is of the type disclosed in Patent No. 1,866,808, will be wound up when carriage member 43 is moved downwardly and the construction is such that the carriage member 43 will be moved upwardly with the returning part of the mechanical timer as clearly described in the above mentioned patent and when a release portion 73 on carriage 43 engages a roller 75 mounted on the upper end of lever 67, latch member 71 will be released from detent lever 67 and the spring 55 will cause quick upward movement of the carrier into its nontoasting position.

The parts of the toaster hereinbefore described are those which constitute a standard toaster, large numbers of which have been made and sold and it is to be understood that the timing mechanism 63 has mounted thereon means permitting of varying its time of operation so that light, medium or dark toast may be obtained and as long as the toast heating elements are subjected to substantially the same energizing supply circuit voltage, say 115 volts, any one setting by an operator, such as "medium," for example, will cause successive slices of bread of the same kind to receive substantially the same browning or degree of toasting as long as the temperature of the toaster remains at the same value.

In case, however, the energizing supply circuit voltage is much lower, a similar slice of bread would be toasted only to the light degree and, therefore, the operator would have to change the setting of the timing mechanism to lengthen the toasting operation and thereby obtain the desired medium degree of toasting.

If medium toast was desired and had been obtained in a toaster operated on a 115 volt circuit and which was then connected to a 125 volt circuit, the degree of toasting would probably be that usually called "dark" if indeed it might not be black or burnt.

It is to be noted further that the first slice of bread to be toasted, starting with a cold toaster, will not be as dark or as well toasted as will, say, the third, fourth or fifth slice of toast when the toaster is operated with but small time intervals, on the order of say five seconds between the successive toasting operations.

A number of different inventions have been made and applied to toasters of the various kinds now on sale which effect what is usually called a compensation for not only the variation of the effect of the different temperatures under which a toaster will operate because of quickly successive operations, but also to take care of the fact that different toasters assembled and tested in the factory at a selected standard voltage, may be operated at much lower or much higher voltages by different purchasers of similar toasters made by the same manufacturer. Thus, if it be assumed that one toaster may operate on a 100 volt supply circuit at one time and may operate on a 125 volt supply circuit at another time, it is evident that the amount of energy translated into heat at the higher voltage is over fifty precent greater than that translated into heat at the lower voltage. The parts now to be described and constituting more particularly our invention provide compensating means which may be considered to be 100% effective to take care of variations in the temperature of the toaster as well as taking care of different supply circuit voltages.

We provide a bimetal member 75 which in the present embodiment is preferably made of substantially U-shape and is connected in electric series circuit with the toast heating elements 23 and 25. We prefer to mount the compensating bimetal strip or bar 75 out of close thermal communication with the body of the toaster and particularly of the toast heating elements and therefore locate it below the base plate 21 which is provided with a ventilating opening 77 immediately above the bar 75 so that air will be drawn inwardly through a properly perforated crumb tray 79, past the bimetal bar 75 and through the opening or openings 77 in the base plate 21, vertically upwardly past the toast heating elements and out through the opening 19.

We provide further a secondary toast heating element control switch including a spring bar 81 connected in series electric circuit with the bimetal bar 75 and the toast heating elements 23 and 25, this bar 81 having a contact member 83 at its free end. A second contact member 85 is mounted on an auxiliary current traversed bimetal bar 87 for a purpose which will hereinafter appear. The free end of the bimetal bar 75 is provided with an adjustable short machine screw 89 which is adapted to engage a small lug 91 of electric insulating material mounted on spring bar 81 near the contact member 83.

The diagrams of connection shown in Figs. 5 and 6 disclose the connections of the toast heating elements, the bimetal bars 75 and 87 and the auxiliary switch just above described. The design and construction of the bimetal bar 75 is such that when heated it will move in a counter-clockwise direction as seen in Fig. 2 of the drawings, and will cause set screw 89 to engage lug 91 on the spring contact bar 81 at a given temperature to thereby cause opening of the heating circuit of the toast heating elements.

It has been found that in a structure of this general kind, contact members 83 and 85 are caused to engage each other and to be disengaged from each other at relatively very short intervals, giving rise to radio interference, and we therefore prefer to provide some means for causing a greater difference of temperature to occur as to bimetal bar 75 before operation of the secondary switch is effected. We may use the secondary bimetal bar 87 which is so designed and constructed that it will move in a clockwise direction, as seen in Fig. 2 of the drawings, when subjected to temperature rise. The effect or result of the action of the secondary bimetal bar 87 is to cause disengagement of contact members 83 and 85 to be effected only after an appreciable change of temperature of bimetal bar 75 and this change of temperature can be made to have any desired value.

We have found by actual tests on compensated toasters of this kind that the operation of a toaster embodying our invention results in substantially the same amount of heat energy reaching or affecting a slice of bread, for a given setting of the timing mechanism such as medium, irrespective of the temperature of the toaster because of closely successive toasting operations or because of connection to different supply circuit voltages. The bimetal bar 75 is, of course, effective, since it is traversed by a current either the same as or proportional to that traversing the toast heating elements, to limit the temperature to which the surfaces of a slice of bread being toasted are subjected. It is further evident that the adjustment and setting of the control parts must be that which will give the desired degree of toasting on the lowest supply circuit voltage which may be used to energize the toast heating elements and that, therefore, a slice of bread toasted in a toaster of the kind embodying our invention will be subjected to a longer toasting operation period than would otherwise be necessary where individual adjustments of the timer might be made to adapt the toaster to say greatly differing supply circuit voltages.

Thus, if a dark piece of toast is desired on a low voltage supply circuit (say 105 volts), the setting of the timer will be such as to give a relatively long toasting operation period and the temperature controlled switch will be actuated to subject the slice of bread to a predetermined amount of heat during the toasting operation. If now the same toaster is connected to a supply circuit of much higher voltage, say 120 volts, and the same degree of toasting is desired, the adjustment of the timer will not be changed. The operation of the temperature controlled switch will be such that the successive energization periods of the toast heating elements will be shorter than when they were connected to the 105 volt circuit and the total amount of watt-seconds supplied to the toast heating elements will be substantially the same as was supplied to the toast heating elements when connected to a 105 volt circuit. If now a light piece of toast is desired, the timer will be manually adjusted by the operator to reduce the length of a toasting operation, but the same general comments made hereinbefore as to dark toast will apply.

One of the results of our new method of toasting is that instead of what may be called purely "surface toasting" being effected, a slice of bread is toasted deeper and the inside of the slice of bread is baked out or dried out to some extent.

Our new method of operation as obtained by the use of a toaster embodying our invention results in the intermittent application of toasting heat, and particularly radiant heat to the surfaces of a slice of bread, the temperature of this heat being definitely limited because of the fact that as soon as this temperature and the temperature of bimetal bar 75 reaches a given value, the current is interrupted. As noted above, the past method has been to use a variable time or length of a toasting period and not to limit the temperature and our invention provides a new method, namely that of a limited maximum temperature and an invariable or fixed length of time of toasting operation irrespective of supply circuit voltage and the temperature of the toaster structure.

It may be further pointed out that when a toaster of the kind embodying our invention is used on a relatively low voltage energizing circuit, the length of the current-on periods will be substantially greater than the length of time of the current-off periods but, of course, this condition will change when the toaster is operated on a circuit of higher voltage.

However, the main distinguishing element of our toaster and its method of operation is that we provide means which will ensure that a substantially preset amount of heat reaches a slice or slices of bread being toasted irrespective of the temperature of the toaster and particularly of its toasting chamber and irrespective also of the voltage of the supply circuit to which the toast heating elements may be connected.

Various modifications and changes may be made in the structure embodying our invention and all such changes clearly coming within the scope of the appended claims are to be considered as being covered thereby.

We claim as our invention:

1. In an automatic electric toaster adapted for operation on electric circuits of different voltages and comprising toast heating elements, a main switch for said heating elements, means to start a toasting operation, a constant speed timer started running in response to said starting means to time the toasting period and operative to cause opening of said main switch and terminate a toasting operation after a preset fixed length of time, a second switch for controlling the energization of the toast heating elements during operation of and independently of the timer and a bimetal bar, of substantially U-shape, located out of close heat-receiving relation with the toast heating elements and electrically connected in series circuit with the toast heating elements and adapted to actuate said second switch to cause continuous application of toasting heat to a slice of bread at the start of a toasting operation until the bimetal bar has reached a predetermined value and intermittent application of toasting heat thereafter for recurrent periods determined by and variable with the value of the input voltage, and to cause the total amount of such heat reaching a slice of bread to be constant irrespective of different energizing voltages applied to the toast heating elements.

2. In an automatic electric toaster adapted to operate on electric circuits of different voltages and at different toaster temperatures and comprising toast heating elements, means to start a toasting operation, a main switch for said heating elements, a constant speed timer started running in response to said starting means to time the toasting period and operative to cause opening of said main switch and terminate a toasting operation after a preset fixed length of time and a second control switch for said toast heating elements during operation of and independently of the timer, a thermal element out of close thermal relation with said toast heating elements, heated in accordance with the current carried by the toast heating elements and adapted to actuate said second control switch to energize and deenergize said toast heating elements consecutively to cause substantially the same amount of heat from the toast heating elements to reach a slice of bread being toasted during said preset fixed length of time irrespective of the energizing voltage applied to the toast heating elements.

3. In an automatic electric toaster adapted to operate at different toaster temperatures and on electric circuits of different voltages and comprising toast heating elements, means to start a toasting operation, a main switch for said heating elements, a constant speed timer started running in response to said starting means to time the toasting period and operative to cause opening of said main switch and terminate a toasting operation after a preset fixed length of time, the improvement comprising means for ensuring that substantially the same amount of heat from said toast heating elements shall reach a slice of bread during said preset fixed length of time of a toasting operation irrespective of variations in the temperature of the toaster and in the energizing voltage applied to the toast heating elements, said means including a thermally-actuable switch controlling energization of said heating elements during operation of and independently of the timer and positioned out of close heat receiving relation with the toast heating elements and heated in accordance with the current carried by the toast heating elements for controlling the energization of the toast heating elements to reduce the total time of energization of the toast heating elements during said preset fixed length of time of a toasting operation with increase in the voltage applied to the toast heating elements.

4. In an automatic electric toaster adapted to operate at different toaster temperatures and on electric circuits of different voltages and comprising toast heating elements, means to start a toasting operation, a main switch for said heating elements, a constant speed timer started running in response to said starting means to time the toasting period and operative to cause opening of said main switch at the end of a toasting operation after a fixed length of time, the improvement comprising means controlling energization of the heating elements during operation of and independently of the timer for ensuring that substantially the same amount of heat from said toast heating elements shall reach a slice of bread during said fixed length of time of a toasting operation irrespective of variations in the temperature of the toaster and in the energizing voltage applied to the toast heating elements, said means including a bimetal bar, of substantially U-shape traversed by the same current carried by the toast heating elements positioned out of close heat receiving relation with the toast heating elements and a second control switch for said toast heating elements actuable by said bimetal bar for causing consecutive energization and deenergization of the toast heating elements during a toasting operation and to increase the total time of energization of the toast heating elements during said fixed length of time of a toasting operation with decrease in the voltage applied to the toast heating elements.

5. In an automatic electric toaster adapted to operate on electric circuits of different voltages and comprising toast heating elements, a main switch for said heating elements, means to start a toasting operation, a constant speed timer started running in response to said starting means to time the toasting period and operative to cause opening of said main switch at the end of a toasting operation after a fixed length of time and a second control switch for controlling the energization of the toast heating elements during operation of and independently of the timer, a bimetal bar, of substantially U-shape, out of close thermal relation with said toast heating elements adapted to carry the current flowing through the toast heating elements and to actuate said second switch to cause intermittent energization of the toast heating elements and intermittent application of relatively high temperature radiant heat to a slice of bread being toasted, said thermally-actuable control switch being effective to limit the temperature reached by the surface of a slice of bread being toasted and to cause substantially the same amount of radiant heat to reach a slice of bread being toasted during said fixed length of time of a toasting operation irrespective of variations in the energizing voltage applied to the toast heating elements.

JOHN R. GOMERSALL.
MURRAY IRELAND.